United States Patent
Takeuchi

(10) Patent No.: US 11,555,762 B2
(45) Date of Patent: Jan. 17, 2023

(54) SAMPLE EXTRACTION SUPPORT TOOL AND SAMPLE EXTRACTION METHOD

(71) Applicant: SHIMADZU CORPORATION, Kyoto (JP)

(72) Inventor: Ippei Takeuchi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 67 days.

(21) Appl. No.: 17/255,489

(22) PCT Filed: Apr. 25, 2019

(86) PCT No.: PCT/JP2019/017579
§ 371 (c)(1),
(2) Date: Dec. 23, 2020

(87) PCT Pub. No.: WO2020/008715
PCT Pub. Date: Jan. 9, 2020

(65) Prior Publication Data
US 2021/0278319 A1  Sep. 9, 2021

(30) Foreign Application Priority Data
Jul. 3, 2018  (JP) .............................. JP2018-126645

(51) Int. Cl.
*G01N 1/02*  (2006.01)
(52) U.S. Cl.
CPC .................................... *G01N 1/02* (2013.01)
(58) Field of Classification Search
CPC ............... G01N 1/02; B01L 2300/0609; B01L 2300/0829; B01L 2300/0861; B01L 2400/0409; B01L 3/5021
See application file for complete search history.

(56) References Cited

U.S. PATENT DOCUMENTS

| | | | |
|---|---|---|---|
| 4,774,962 A | 10/1988 | Hebel | |
| 5,475,610 A * | 12/1995 | Atwood | G05D 23/1917 422/943 |

(Continued)

FOREIGN PATENT DOCUMENTS

| | | |
|---|---|---|
| EP | 3 273 217 A1 | 1/2018 |
| JP | 45-007226 B1 | 3/1970 |

(Continued)

OTHER PUBLICATIONS

International Search Report for corresponding Application No. PCT/JP2019/017579, dated Jul. 16, 2019.

(Continued)

*Primary Examiner* — Francis C Gray
(74) *Attorney, Agent, or Firm* — Renner, Otto, Boisselle & Sklar, LLP

(57) ABSTRACT

The sample extraction support tool is placed on an extraction container having at least one well for accommodating a sample extracted from a test piece holding the sample in a microchannel provided therein with both ends open. The sample extraction support tool includes at least one test piece holding portion having an opening for guiding a sample extracted from the test piece to a bottom of the well and configured to hold the test piece at a position where the test piece is not in contact with the sample which is extracted from the test piece and is stored on the bottom of the well, and in a state where one end of the microchannel is directed to the bottom of the well.

7 Claims, 3 Drawing Sheets

(56) References Cited

U.S. PATENT DOCUMENTS

| 7,387,899 B1 | 6/2008 | D'Angelo | |
|---|---|---|---|
| 2002/0032410 A1 | 3/2002 | Inoue | |
| 2010/0248213 A1 | 9/2010 | Feiglin | |
| 2016/0139138 A1* | 5/2016 | Burd | B01L 3/5025 |
| | | | 506/9 |
| 2018/0345276 A1* | 12/2018 | Iwasawa | G01N 1/10 |
| 2019/0011334 A1 | 1/2019 | Takeuchi | |
| 2020/0061609 A1* | 2/2020 | Tajima | B01L 7/52 |
| 2021/0299672 A1* | 9/2021 | Lohan | B01L 9/06 |

FOREIGN PATENT DOCUMENTS

| JP | 2001-289844 A | 10/2001 | |
|---|---|---|---|
| WO | 2013/123035 A1 | 8/2013 | |
| WO | WO-2016168692 A1 * | 10/2016 | A61B 5/15 |
| WO | 2017/122372 A1 | 7/2017 | |

OTHER PUBLICATIONS

Written Opinion for corresponding Application No. PCT/JP2019/017579, dated Jul. 16, 2019 (Machine Translation).
Office Action for corresponding JP Application No. 2020-528697 dated Aug. 3, 2021, with English language translation.
Extended European Search Report for corresponding EP Application No. 19830201.0 dated Feb. 4, 2022.

* cited by examiner

SAMPLE EXTRACTION SUPPORT TOOL AND SAMPLE EXTRACTION METHOD

TECHNICAL FIELD

The present invention relates to a sample extraction support tool used to extract a sample using a centrifugal force from a piece cut from a micro-sampling device or a sampling capillary having a microchannel inside, and a sample extraction method using the sample extraction support tool.

BACKGROUND ART

As a device for collecting biological samples such as blood, tears, and urine, a micro-sampling device that sucks a sample from an intake port into an internal microchannel using capillarity has been proposed (see Patent Document 1). The micro-sampling device disclosed in Patent Document 1 can cut a piece including part of a microchannel holding a sample and use a certain amount of the sample for analysis. Further, a capillary having a microchannel inside may be used for collecting a sample.

Hereinafter, a piece of a micro-sampling device or a capillary that holds a sample to be analyzed will be generally referred to as a test piece.

PRIOR ART DOCUMENT

Patent Document

Patent Document 1: WO2017/122372A1

SUMMARY OF THE INVENTION

Problems to be Solved by the Invention

A sample held in a test piece may be subjected to pretreatment such as extraction, deproteinization, and dilution of a component to be analyzed. In a case where the pretreatment is performed, for example, a method of putting a test piece and an organic solvent in a container such as a microtube with a sealable lid and stirring the inside of the container to mix the sample and the organic solvent to make them homogeneous may be employed. However, this method requires the use of a sealable container and cannot be performed with a container having an open upper side, such as a 96-well-plate. Further, the above method has a problem that it takes time because the sample in the test piece is homogenized by the diffusion phenomenon.

As another method, it is conceivable to extract a sample from a test piece using a centrifugal force. In that case, the sample in the test piece can be extracted by putting the test piece into a container and swiveling the container so that a centrifugal force acts in the direction from the top surface to the bottom surface of the container. However, since the test piece is in contact with the bottom surface of the container even after the sample is extracted from the test piece, part of the extracted sample is sucked again into the test piece due to the capillarity, and the quantitativity of the sample may be impaired.

In view of the above, an object of the present invention is to make it possible to extract a sample from a test piece using a centrifugal force while ensuring the quantitativity of the sample to be analyzed.

Solutions to the Problems

The sample extraction support tool according to the present invention is used while being placed on an extraction container having at least one well for accommodating a sample extracted from a test piece holding the sample in a microchannel provided therein with both ends open. The sample extraction support tool includes at least one test piece holding portion. The test piece holding portion has an opening for guiding the sample extracted from the test piece to a bottom of the well and is configured to hold the test piece at a position where the test piece is not in contact with the sample which is extracted from the test piece and is stored on the bottom of the well, and in a state where one end of the microchannel is directed to the bottom surface of the well.

The sample extraction support tool of the present invention is premised on using a centrifugal force to extract the sample held in the test piece to the bottom of the extraction container. The test piece is held by the test piece holding portion so that one end of the microchannel is directed to the bottom of the well, and when an extraction container is swiveled so that a centrifugal force acts in the direction from a top side of the well to a bottom side of the well, the sample flows out from one end of the test piece, and the sample is extracted to the bottom of the well through the opening provided on the test piece holding portion. At this time, since the test piece is held at a position where the test piece is not in contact with the sample stored on the bottom of the well by the test piece holding portion, the sample extracted from the test piece is not sucked again into the test piece due to the capillarity.

In a preferred embodiment of the sample extraction support tool of the present invention, the opening is provided at a lower end of the test piece holding portion and has a size not allow the test piece to pass through, and at least part of an inner surface of the test piece holding portion is inclined so as to guide the sample extracted from the test piece to the opening.

As the extraction container, a well-plate in which a plurality of the wells are provided in the same plane can be used. In this case, the sample extraction support tool can be a plate-shaped member having the test piece holding portions corresponding to each of the wells of the extraction container.

A sample extraction method according to the present invention includes a support tool placing step of placing, on an extraction container having at least one well for accommodating a sample extracted from a test piece accommodating the sample in a microchannel provide therein with both ends open, the sample extraction support tool, a piece setting step of causing the test piece holding portion of the sample extraction support tool to hold the test piece, and a sample extracting step of extracting a sample from the test piece to the bottom of the well by swiveling the extraction container so that a centrifugal force acts in a direction from a top side of the well to a bottom side of the well of the extraction container, in this order.

A preferred embodiment includes a test piece removing step of removing the test piece from the well of the extraction container by moving the sample extraction support tool from above the extraction container after the sample extracting step.

Effects of the Invention

The sample extraction support tool according to the present invention includes the test piece holding portion that is mounted on a top surface of the extraction container and holds a test piece at a position where the test piece is not in contact with a sample which is extracted from the test piece and is stored on the bottom surface of the well. Accordingly, it is possible to prevent the sample extracted from the test piece from being sucked again into the test piece due to the capillarity. This makes it possible to extract the sample from the test piece using a centrifugal force while ensuring the quantitativity of the sample to be analyzed.

In the sample extraction method according to the present invention, a sample is extracted using a centrifugal force by using the above-mentioned sample extraction support tool. Accordingly, it is possible to extract the sample into the extraction container while ensuring the quantitativity of the sample to be analyzed.

EMBODIMENT OF THE INVENTION

Hereinafter, an embodiment of the sample extraction support tool and an embodiment of the sample extraction method using the sample extraction support tool will be described with reference to the drawings.

Figure 1:
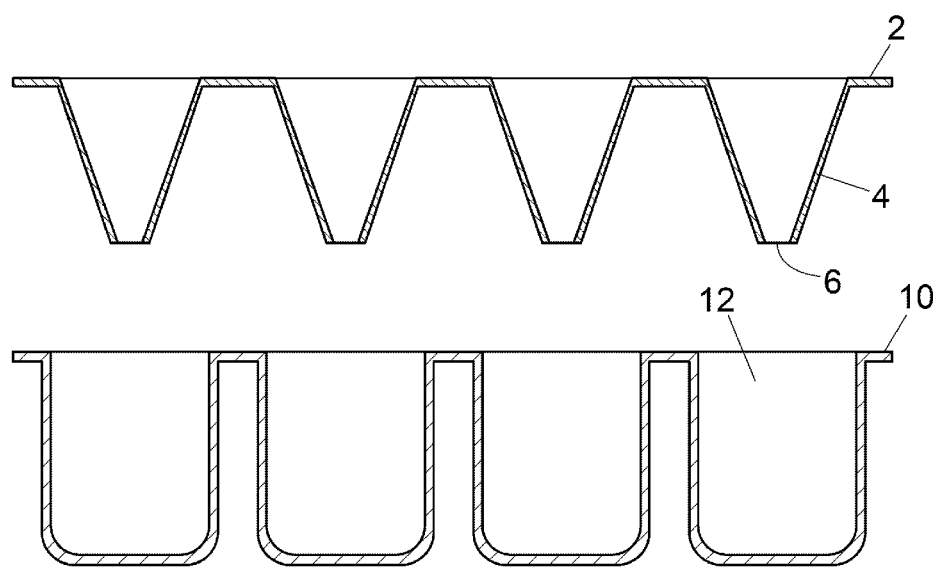
FIG. 1 is a cross-sectional view showing an embodiment of a sample extraction support tool together with an extraction container.

As shown in FIG. 1, a sample extraction support tool 2 of the present embodiment is used together with an extraction container 10 having a plurality of wells 12 having an open upper part. The sample extraction support tool 2 is a member on a plate having a test piece holding portion 4 corresponding to each of the wells 12 of the extraction container 10. The test piece holding portion 4 has a funnel shape in which the inner diameter decreases toward the bottom, and an opening 6 is provided at the lower end. Note that the shape of the test piece holding portion 4 is not limited to the funnel shape, and may be one in which at least part of the inner surface is inclined so that a sample extracted from a test piece 20 is guided to the opening 6 at the lower end.

Figure 2:
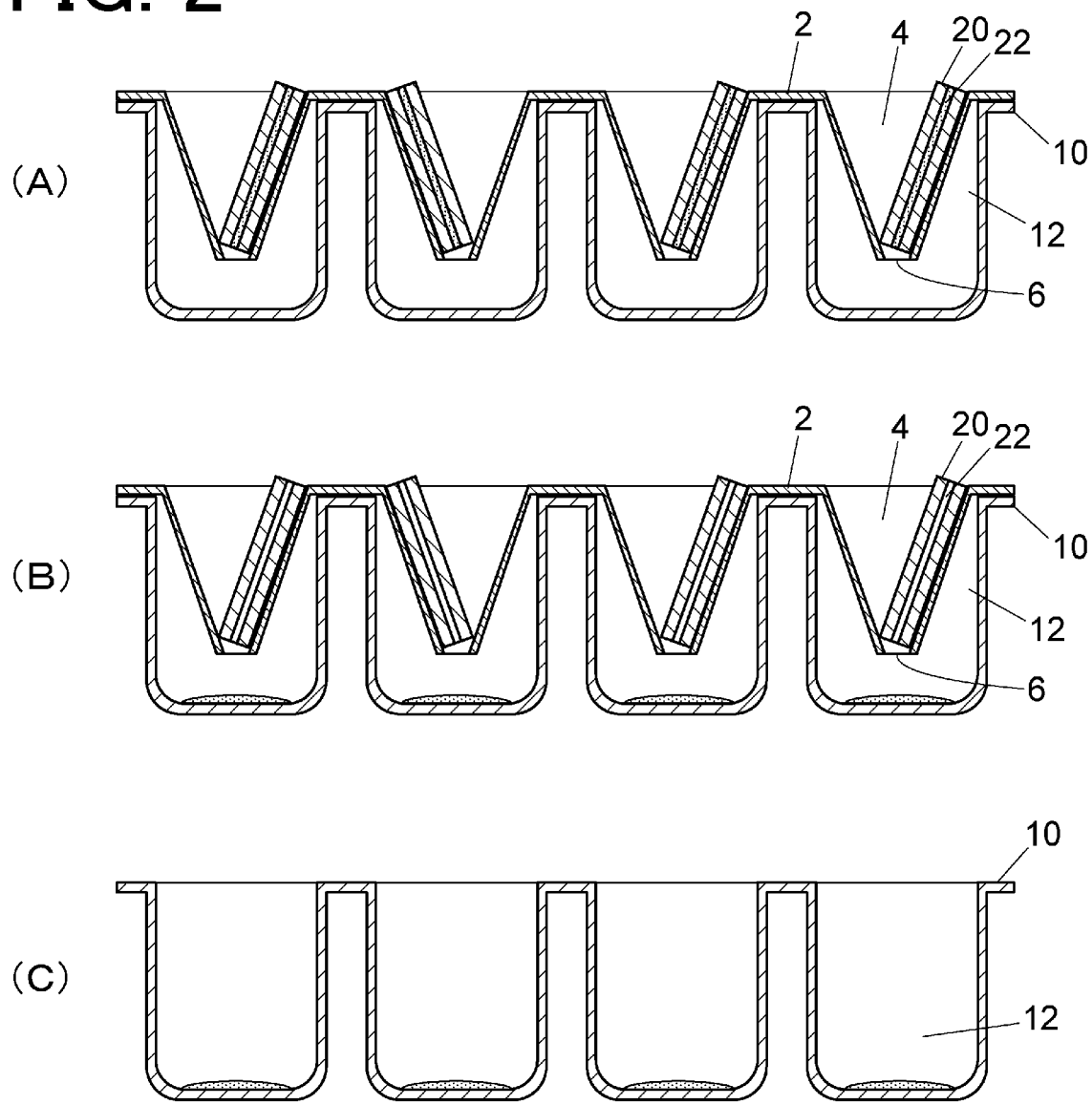
FIG. 2 is a cross-sectional view showing a sample extraction process using the sample extraction support tool of the embodiment in order.

As shown in FIG. 2(A), the sample extraction support tool 2 is used in a state of being placed on the extraction container 10. The test piece 20 holding the sample to be extracted is inserted into the test piece holding portion 4 from above. The inner diameter of the opening 6 of the test piece holding portion 4 has size that prevents the test piece 20 from falling to the bottom of the well 12. The test piece 20 inserted into the test piece holding portion 4 is supported by the inner side surface of the test piece holding portion 4 in a state where one end is directed to the bottom of the well 12.

The test piece 20 has a microchannel with both ends open therein, and holds a sample in the microchannel. The test piece 20 may be a piece cut from a micro-sampling device as disclosed in Patent Document 1, or may have a capillary shape such as a capillary.

In a state where the test piece 20 is held in each of the test piece holding portions 4 of the sample extraction support tool 2, an integral body of the sample extraction support tool and the extraction container 10 is swiveled so that a centrifugal force acts in the direction from a top side of the well 12 to a bottom side of the well 12, so that, as shown in FIG. 2(B), a sample flows out from one end of the test piece 20 and the sample is extracted to the bottom of the well 12 through the opening 6 of the test piece holding portion 4. At this time, since the test piece 20 is held by the test piece holding portion 4 at a position where the test piece 20 is not in contact with the sample extracted on the bottom of the well 12, the extracted sample is not sucked again into the test piece 20.

After that, as shown in FIG. 2(C), all the test pieces 20 can be removed from the wells 12 as the sample extraction support tool 2 is moved from above the extraction container 10. For this reason, processing on the sample in the wells 12 can be facilitated.

Figure 3:
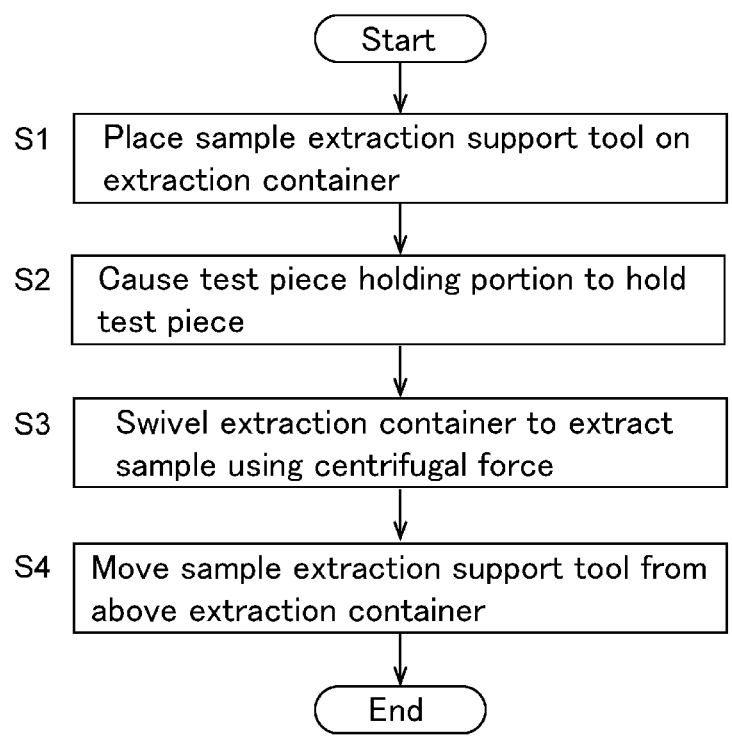
FIG. 3 is a flowchart showing a sample extraction method using the sample extraction support tool of the embodiment.

That is, as shown in FIG. 3, the sample extraction method using the sample extraction support tool 2 of the present embodiment includes four steps described below.

(Step S1) Place the sample extraction support tool 2 on the extraction container 10.

(Step S2) Cause each of the test piece holding portions 4 of the sample extraction support tool 2 to hold the test piece 20.

(Step S3) Swivel the extraction container 10 with the sample extraction support tool 2 placed on to extract the sample using a centrifugal force.

(Step S4) Move the sample extraction support tool 2 from above the extraction container 10.

Note that the sample extraction support tool 2 of the above embodiment is applied to the extraction container 10 having a plurality of the wells 12. However, the present invention is not limited to this, and can be similarly applied to an extraction container having only one well.

DESCRIPTION OF REFERENCE SIGNS

2: Sample extraction support tool
4: Test piece holding portion
6: Opening
10: Extraction container
12: Well
20: Test piece
22: Microchannel

The invention claimed is:

1. A sample extraction tool comprising a test piece and a sample extraction support tool, wherein
the test piece has a longitudinal direction and includes a microchannel for holding a sample, which is parallel to the longitudinal direction of the test piece, of which both ends open,
the sample extraction support tool is used while being placed on an extraction container having at least one well for accommodating the sample extracted from the test piece, and
the sample extraction support tool comprises at least one test piece holding portion, the test piece holding portion has an opening for guiding the sample extracted from the test piece to a bottom of the well, and is configured to hold the test piece at a position where the test piece is not in contact with the sample which is extracted from the test piece and is stored on the bottom of the well, and in a state where one end of the microchannel is directed to the bottom surface of the well.

2. The sample extraction support tool according to claim 1, wherein the opening is provided at a lower end of the test piece holding portion and has a size not allow the test piece to pass through, and at least part of an inner surface of the test piece holding portion is inclined so as to guide the sample extracted from the test piece to the opening.

3. A sample extraction support tool which is used while being placed on an extraction container having at least one well for accommodating a sample extracted from a test piece holding the sample in a microchannel provided therein with both ends open, wherein
the sample extraction support tool comprises at least one test piece holding portion, the test piece holding portion has an opening for guiding the sample extracted from the test piece to a bottom of the well, and is configured to hold the test piece at a position where the test piece is not in contact with the sample which is extracted from the test piece and is stored on the bottom of the well, and in a state where one end of the microchannel is directed to the bottom surface of the well, and
wherein
the extraction container is a well-plate in which a plurality of the wells are provided on a same plane, and
the sample extraction support tool is a plate-shaped member having the test piece holding portions corresponding to each of the wells of the extraction container.

4. A sample extraction method for extracting a sample from a test piece, wherein
the test piece has a longitudinal direction and includes a microchannel for holding a sample, which is parallel to the longitudinal direction of the test piece, of which both ends open,
the sample extraction method comprises:
a support tool placing step of placing, on an extraction container having at least one well for accommodating a sample extracted from the test piece, a sample extraction support tool including at least one test piece holding portion, the test piece holding portion having an opening for guiding a sample extracted from the test piece to a bottom of the well and configured to hold the test piece at a position where the test piece is not in contact with a sample which is extracted from the test piece and stored on the bottom of the well, and in a state where one end of the microchannel is directed to the bottom of the well;
a piece setting step of causing the test piece holding portion of the sample extraction support tool to hold the test piece; and
a sample extracting step of extracting a sample from the test piece to the bottom of the well by swiveling the extraction container so that a centrifugal force acts in a direction from a top side of the well to a bottom side of the well of the extraction container,
in this order.

5. The sample extraction method according to claim 4, further comprising:
a test piece removing step of removing the test piece from the well of the extraction container by moving the sample extraction support tool from above the extraction container after the sample extracting step.

6. The sample extraction method according to claim 4, wherein
the opening of the sample extraction support tool is provided at a lower end of the test piece holding portion and has a size not allow the test piece to pass through, and at least part of an inner surface of the test piece holding portion is inclined so as to guide the sample extracted from the test piece to the opening.

7. A sample extraction method comprising:
a support tool placing step of placing, on an extraction container having at least one well for accommodating a sample extracted from a test piece holding the sample in a microchannel provided therein with both ends open, a sample extraction support tool including at least one test piece holding portion, the test piece holding portion having an opening for guiding a sample extracted from the test piece to a bottom of the well and configured to hold the test piece at a position where the test piece is not in contact with a sample which is extracted from the test piece and stored on the bottom of the well, and in a state where one end of the microchannel is directed to the bottom of the well;
a piece setting step of causing the test piece holding portion of the sample extraction support tool to hold the test piece; and
a sample extracting step of extracting a sample from the test piece to the bottom of the well by swiveling the extraction container so that a centrifugal force acts in a direction from a top side of the well to a bottom side of the well of the extraction container,
in this order,
wherein
the extraction container is a well-plate in which a plurality of the wells are provided on a same plane, and
the sample extraction support tool is a plate-shaped member having the test piece holding portions corresponding to each of the wells of the extraction container.

* * * * *